United States Patent
Averick et al.

(10) Patent No.: US 12,433,883 B2
(45) Date of Patent: Oct. 7, 2025

(54) COVALENT MODIFICATION AND CONTROLLED DELIVERY OF MU OPIOID RECEPTOR ANTAGONISTS

(71) Applicant: Allegheny Singer Research Institute, Pittsburgh, PA (US)

(72) Inventors: Saadyah Averick, Pittsburgh, PA (US); Andrew Kassick, Wexford, PA (US)

(73) Assignee: Allegheny Singer Research Institute, Pittsburgh, PA (US)

( * ) Notice: Subject to any disclaimer, the term of this patent is extended or adjusted under 35 U.S.C. 154(b) by 810 days.

(21) Appl. No.: 17/598,691

(22) PCT Filed: Mar. 27, 2020

(86) PCT No.: PCT/US2020/025266
§ 371 (c)(1),
(2) Date: Sep. 27, 2021

(87) PCT Pub. No.: WO2020/205537
PCT Pub. Date: Oct. 8, 2020

(65) Prior Publication Data
US 2022/0152017 A1    May 19, 2022

Related U.S. Application Data

(60) Provisional application No. 62/826,438, filed on Mar. 29, 2019.

(51) Int. Cl.
*A61K 31/485* (2006.01)
*A61K 47/69* (2017.01)
*A61P 25/36* (2006.01)

(52) U.S. Cl.
CPC ........ *A61K 31/485* (2013.01); *A61K 47/6937* (2017.08); *A61P 25/36* (2018.01)

(58) Field of Classification Search
CPC .............. A61K 31/485; A61K 47/6937; A61K 31/4468; A61P 25/36
See application file for complete search history.

(56) References Cited

U.S. PATENT DOCUMENTS

| | | | |
|---|---|---|---|
| 7,662,365 B2 | 2/2010 | Bentley et al. | |
| 8,840,915 B2 | 9/2014 | Li et al. | |
| 2012/0231069 A1 | 9/2012 | Nowotnik et al. | |
| 2012/0277376 A1 | 11/2012 | Baker, Jr. et al. | |
| 2016/0136153 A1* | 5/2016 | Jenkins | A61P 25/04 514/282 |

OTHER PUBLICATIONS

Chanlen et al. (Journal of Polymer Research 2012, vol. 19, No. 36, 1-12) (Year: 2016).*
Makadia et al., Poly Lactic-co-Glycolic Acid (PLGA) as Biodegradable Controlled Drug Delivery Carrier, Aug. 26, 2011, Polymers, 3, 1377-1397. (Year: 2011).*
WikiAnesthesia (Naloxone). Retrieved Feb. 15, 2025 (Year: 2025).*
Polysciences (Poly(L-lactide)). Retrieved Feb. 15, 2025 (Year: 2025).*
Sanna et al., Novel docetaxel-loaded nanoparticles based on poly(lactide-co-caprolactone) and poly(lactideco-glycolide-co-caprolactone) for prostate cancer treatment: formulation, characterization, and cytotoxicity studies, Nanoscale Research Letters, 2011, 6:260.
Dove, A., Organic Catalysis for Ring-Opening Polymerization, ACS Macro Lett. 2012, 1, 1409-1412.
Lax, N. et al., PolyMorphine provides extended analgesiclike effects in mice with spared nerve injury, Molecular Pain, vol. 13, 1-12, 2017.
Kamaly, N. et al., Degradable Controlled-Release Polymers and Polymeric Nanoparticles: Mechanisms of Controlling Drug Release, Chem Rev, Feb. 24, 2016, 116(4): 2602-2663.
Huang, Xiao et al., On the importance and mechanisms of burst release in matrix-controlled drug delivery systems, Journal of Controlled Release, 2001, 73: 121-136.
Tong, R. et al., Ring-Opening Polymerization-Mediated Controlled Formulation of Polylactide-Drug Nanoparticles, J. Am. Chem. Soc., 2009, 131: 4744-4754.
Kovaliov, M. et al., Extended-release of opioids using fentanyl-based polymeric nanoparticles for enhanced pain management, RSC Adv., 2017, 7: 47904-47912.
Sutter, M. et al., Fatal Fentanyl: One Pill Can Kill, Academic Emergency Medicine, Jan. 2017, vol. 24, No. 1, 106-113.
Van der Schier, R. et al., Opioid-induced respiratory depression: reversal by non-opioid drugs, FI000Prime Reports, 2014, 6:79, 8 pages.
Zuckerman, M. et al., Pitfalls of Intranasal Naloxone, Prehosp Emerg Care, 2014, 18(4): 550-554.
Dahan, A. et al., Incidence, Reversal, and Prevention of Opioid-induced Respiratory Depression, Anesthesiology 2010, 112:226-38.
Pattinson, K.T.S., Opioids and the control of respiration, British Journal of Anaesthesia, 2008, 100(6): 747-58.
Le Merrer, J. et al., Reward Processing by the Opioid System in the Brain, Physiol Rev 2009, 89: 1379-1412.
Brown, H. et al., Amidine-Mediated Zwitterionic Polymerization of Lactide, ACS Macro Lett. 2012, 1(9): 113-1115 (abstract).
Coady, D. et al., Catalytic insights into acid/base conjugates: highly selective bifunctional catalysts for thering-opening polymerization of lactide, Chem Comm, 2011, 47: 3105-3107 (abstract).

(Continued)

*Primary Examiner* — Frederick F Krass
*Assistant Examiner* — Abdulrahman Abbas
(74) *Attorney, Agent, or Firm* — Fox Rothschild LLP

(57) ABSTRACT

Polymer conjugates comprising a hydrophobic biodegradable polymer covalently attached to a mu opioid receptor (MOR) antagonist are described. Biodegradable covalent nanoparticles comprising the hydrophobic biodegradable polymer covalently attached to a MOR antagonist are provided as a vehicle for the sustained delivery of the MOR antagonist. The described MOR antagonist delivery system may be used to more effectively prevent or overcome the toxic effects of synthetic opioids.

24 Claims, 9 Drawing Sheets

(56) References Cited

OTHER PUBLICATIONS

Kazakov, O., Cocatalyst Binding Effects in Organocatalytic Ring-Opening Polymerization of L-Lactide, Macromolecules, 48(17): 6121-6126, NPL Date: Aug. 27, 2015.
Du, A. et al., Drug Carriers for the Delivery of Therapeutic Peptides, Biomacromolecules, 2014, 15(4): 1097-1114 (abstract).
Dixon, W.J., Efficient Analysis of Experimental Observations, Annual Review of Pharmacology and Toxicology, vol. 20: 141-462 (abstract), NPL Year: 1980.
Okino, T. et al., Enantioselective Aza-Henry Reaction Catalyzed by a BifunctionalOrganocatalyst, Org. Lett. 2004, 6(4): 625-27 (abstract).
Okino, T. et al., Enantioselective Michael Reaction of Malonates to NitroolefinsCatalyzed by Bifunctional Organocatalysts, J. Am. Chem. Soc. 2003, 125(42): 12672-73 (abstract).
Lohmeijer, B.G.G. et al., Guanidine and Amidine Organocatalysts for Ring-OpeningPolymerization of Cyclic Esters, Macromolecules 2006, 39(25): 8574-83 (abstract).
Pothupitiya, J. et al., H-Bonding Organocatalysts for the Living, Solvent-Free Ring-Opening Polymerization of Lactones: Toward an All-Lactones, All-Conditions Approach, Macromolecules 2017, 50(22): 8948-54 (abstract).
Contet, C. et al., Mu opioid receptor: a gateway to drug addiction, Current Opinion in Neurobiology, vol. 14, Issue 3, Jun. 2004, p. 370-78 (abstract).
Chaplan, S.R. et al., Quantitative assessment of tactile allodynia in the rat paw, Journal of Neuroscience Methods, vol. 53, Issue 1, Jul. 1994, p. 55-63 (abstract).
Spink, S. et al., Rate Accelerated Organocatalytic Ring-Opening Polymerization ofL-Lactide via the Application of a Bis (thiourea) H-bond DonatingCocatalyst, Macromolecules, Sep. 8, 2015, 48(17): 6127-131 (abstract).
Dove, A. et al., Thiourea-Based Bifunctional Organocatalysis: SupramolecularRecognition for Living Polymerization, J. Am. Chem. Soc. 2005, 127(40): 13798-99 (abstract).
Pratt, R. et al., Triazabicyclodecene: A Simple Bifunctional Organocatalyst for Acyl Transfer and Ring-Opening Polymerization of Cyclic Esters, J. Am. Chem. Soc. 2006, 128(14): 4556-57 (abstract).

\* cited by examiner

COVALENT MODIFICATION AND CONTROLLED DELIVERY OF MU OPIOID RECEPTOR ANTAGONISTS

CROSS-REFERENCE AND CLAIM OF PRIORITY

This patent application is a national entry of International Patent Application No. PCT/US2020/025266 filed Mar. 27, 2020, which claims priority to U.S. Provisional Patent Application No. 62/826,438 filed Mar. 29, 2019, the entirety of which are incorporated herein by reference.

TECHNICAL FIELD

This document describes novel forms and compositions of mu opioid receptor (MOR) antagonists and methods of making their therapeutic compositions and components. In various embodiments, these therapeutics may be used for the treatment or prevention of one or more side effects associated with the use or misuse of opioid analgesics. This document also provides a drug delivery system (DDS) capable of providing a steady, sufficient dose of MOR antagonist to more effectively overcome the toxic effects of opioids, and particularly synthetic opioids.

The novel therapeutic agents may include a polymer conjugate comprising a hydrophobic biodegradable polymer covalently attached to a MOR antagonist. The polymer conjugate may be administered in the form of therapeutic nanoparticles. Methods of making the polymer conjugates of the MOR antagonists and methods of making the nanoparticles of the polymer conjugates are also provided.

BACKGROUND

Opioid analgesics, primarily those active at the mu opioid receptor (MOR), have been used throughout human history as an effective means to alleviate pain. While these compounds are well known for their effective therapeutic profiles, MOR agonists still present several serious limitations, including constipation, respiratory depression, and a heightened potential for addiction and abuse.[1-3] This increased abuse potential has recently fueled an unprecedented epidemic of opioid overdoses and deaths in the United States (US) with highly potent, synthetic MOR agonists such as fentanyl and its related analogs at the center of the crisis.

A recent disclosure by the Centers for Disease Control (CDC) has attributed the exponential rise in fatal opioid overdoses observed in the US since 2012 to the proliferated abuse of prescription and illicit forms of synthetic opioids. Additionally, it has been estimated that more than half of the nearly 48,000 opioid-related mortalities reported in 2017 have been the result of a synthetic opioid overdose.[4] This explosion in the number of synthetic opioid-related deaths has added to the growing concern surrounding these compounds and the ever-present threat they pose to the general public resulting in the recent declaration of the US opioid epidemic as a national public health emergency.

The most notable attempt to manage the crisis has been the widespread distribution of MOR antagonist compounds such as naloxone (Narcan®). However, due to their metabolic lability, the current generation of clinically approved MOR antagonists is failing to provide an effective treatment against synthetic opioid toxicity.

While naloxone (Narcan®) is considered the gold standard for reversing the toxic effects of MOR agonists such as morphine, heroin, and oxycodone, the advent of the abuse of highly potent MOR agonists such as fentanyl and other synthetic opioids has revealed the limitations of naloxone and a need for the development of new MOR antagonists to combat the dangers posed by these compounds. The diminished efficacy against synthetic opioids exhibited by naloxone can be explained by the high potency and hydrophobicity possessed by the fentanyl class of MOR agonists in combination with the rapid metabolism and clearance of naloxone from the body via UGT2B7-mediated glucuronidation of the C3 phenol moiety. As a result, the administration of larger or multiple doses of naloxone are required to reverse the symptoms of synthetic opioid overdose and prevent a dangerous and potentially fatal condition known as renarcotization, where a patient, despite being treated with naloxone, can experience the recurrence of opioid toxicity from the slow permeation of residual synthetic opioids from adipose tissue.[5-8] Therefore, in order to more effectively address this serious issue, new formulations of opioid reversal agents with improved pharmacokinetic profiles that are capable of providing longer-lasting antagonistic effects are needed.

SUMMARY

This document identifies, in certain aspects, polymer conjugates comprising a hydrophobic biodegradable polymer covalently attached to a MOR antagonist. In certain aspects, methods of making these conjugates are described.

Biodegradable covalent nanoparticles comprising the hydrophobic biodegradable polymer covalently attached to a MOR antagonist are provided as a vehicle for the sustained delivery of the MOR antagonist. The described MOR antagonist delivery system is capable of providing a sustained, sufficient dose of MOR antagonist to more effectively prevent or overcome the toxic effects of synthetic opioids.

DETAILED DESCRIPTION

Figure 1:
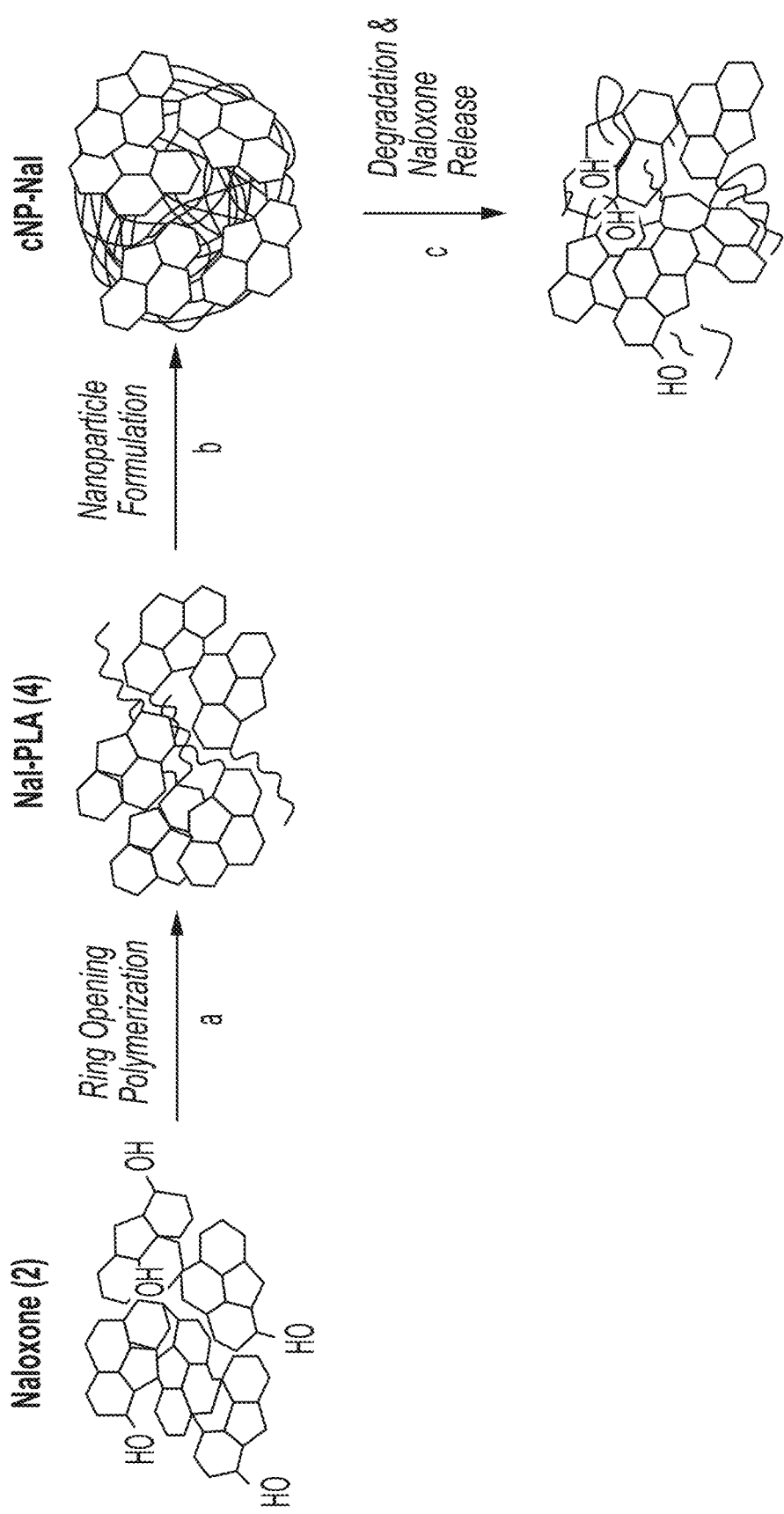
FIG. 1 shows a schematic representation of covalent naloxone nanoparticle (cNP-Nal) formation: (a) naloxone-initiated ring opening polymerization of lactide affords naloxone-poly(L-lactic acid) polymer 4; (b) polymer 4 is converted to the corresponding nanoparticles (cNP-Nal); and (c) ester hydrolysis releases naloxone in a controlled manner.
Figure 2:
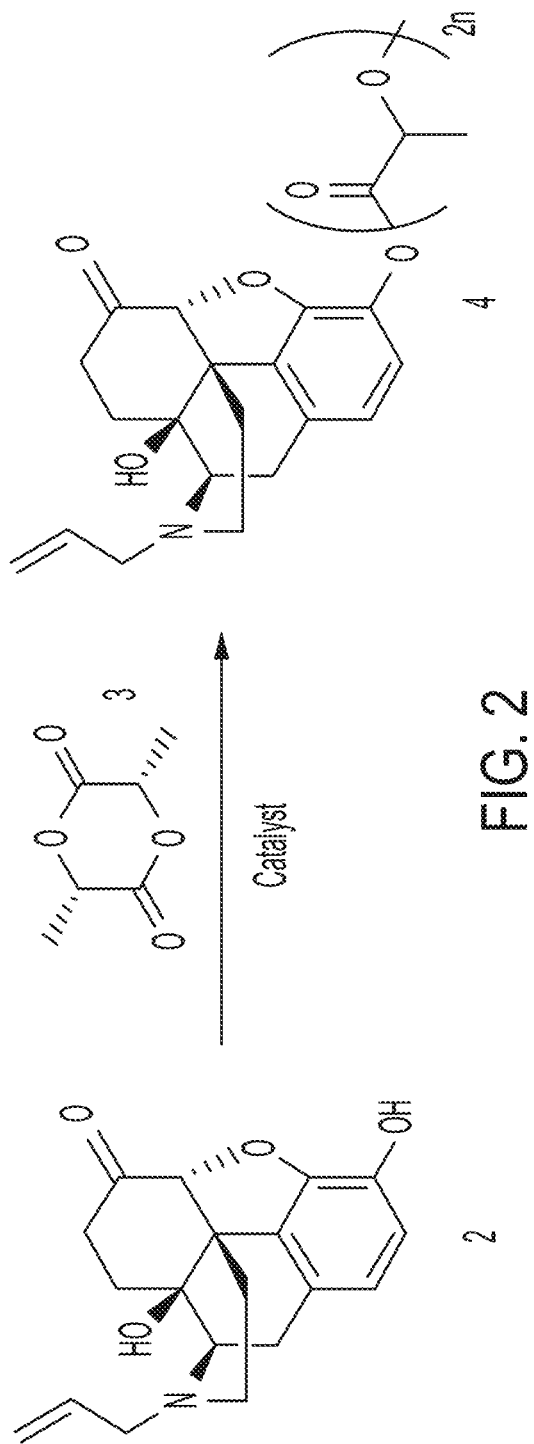
FIG. 2 shows the preparation of naloxone-poly(L-lactic acid) by the ring-opening polymerization of lactide in the presence of a catalyst and with naloxone as the initiator.

This document describes novel polymer conjugates of MOR antagonists and methods of making the polymer conjugates of MOR antagonists. In various embodiments, the polymer conjugates of MOR antagonists may be used to treat or prevent the toxic effects of opioid misuse, for example to treat opioid overdose or to treat or thwart opioid abuse. The MOR antagonist-polymer conjugates and nanoparticles may provide a steady, sufficient dose of MOR antagonist such as naloxone to reverse an opioid overdose and to sustain the reversal, while at the same time avoiding the effects of precipitated opioid withdrawal.

The polymer conjugates of MOR antagonists comprise a hydrophobic polymer covalently attached to the MOR antagonist. Under physiological conditions, the polymer conjugates degrade to release the desired MOR antagonist.

For certain embodiments, the present inventors have designed covalent conjugates of MOR antagonist with hydrophobic biodegradable polyesters, and nanoparticles prepared from these conjugates. The present inventors have also developed methods of making such conjugates and nanoparticles. The biodegradable covalent nanoparticles are used as a vehicle for the sustained delivery of MOR antagonists in drug delivery systems capable of providing a sustained, sufficient dose of MOR antagonists to more effectively overcome the toxic effects of synthetic opioids.

A mu opioid receptor antagonist, or MOR antagonist, is any molecule that blocks the action of a mu opioid agonist. MOR antagonists are opioid antagonist drugs, which competitively bind to the opioid receptors with high affinity, but preferably do not activate the receptors. This effectively blocks the receptor, preventing or reducing the body's response to opioids. Suitable MOR antagonists include, but are not limited to, naloxone, naltrexone, nalmefene, N-methylnaloxone, N-methylnaltrexone, samidorphan, and naldemedine.

The polymer of the conjugate is hydrophobic. The polymer may additionally be biodegradable, i.e., capable of being broken down in the tissue of the treated organism.

In general, the polymer portion of the conjugate should be non-toxic and biocompatible, meaning that the polymer is capable of coexistence with living tissues or organisms without causing substantial undesirable side effects. The polymer portion of a conjugate of the invention may be linear or branched, but is preferably linear.

The polymer is covalently attached to the MOR antagonist by a biodegradable and/or hydrolytically labile linker. The term "linker" refers to an atom or group of atoms used to connect, through one or more covalent bonds, the polymer and MOR antagonist. The linker is biodegradable and/or hydrolytically labile such that it is physiologically hydrolyzable and/or undergoes enzymatic degradation in vivo. Hydrolytically labile linkers include, but are not limited to, esters, silyl ethers, and tetrahydropyranyl (THP) ethers.

Suitable polymers for covalent attachment to the MOR antagonist include biocompatible and biodegradable polyesters. Polyesters for use in the MOR antagonist conjugates include, but are not limited to, L-polylactic acid, D-polylactic acid, DL-polylactic acid, polyglycolic acid, poly p-dioxanone, L-lactide/glycolic acid copolymer, L-lactide/epsilon caprolactone copolymer, D-lactide/glycolic acid copolymer, D-lactide/epsilon caprolactone copolymer, DL-lactide/glycolic acid copolymer, DL-lactide/epsilon caprolactone copolymer, glycolide/epsilon-caprolactone copolymer, glycolide/trimethylene carbonate copolymer, and the like.

In certain embodiments, the conjugates are formed between a MOR antagonist and the polymers by ring-opening polymerization. In the ring-opening polymerization, the MOR antagonist having at least one functional group useful for initiation of ring-opening polymerization is combined with one or more cyclic monomers which can be polymerized by ring-opening polymerization and an appropriate ring-opening polymerization catalyst. The reaction may be solvent free or may be performed in an appropriate solvent, under conditions and for a sufficient time to form the polymers as desired.

The MOR antagonist-polymer conjugates may be formed during polymerization of the polymer in which the MOR antagonist is employed as an initiator of the polymerization of the monomers which form the polymer. More specifically, the MOR antagonist-polymer conjugates are formed by ring-opening polymerization of cyclic monomers in the presence of an appropriate ring-opening polymerization catalyst. The MOR antagonist contains at least one functional group which can function for initiation of the ring-opening polymerization reaction, e.g. a hydroxyl group. The hydroxyl group can most generally be a primary, secondary or tertiary hydroxyl group attached to a carbon, or a phenolic hydroxyl, i.e., a hydroxy group attached to a carbon of an aromatic ring. Accordingly, the initiator for the ring-opening polymerization is the MOR antagonist by virtue of its hydroxy group (typically a phenolic hydroxy).

The monomer for use in the ring-opening polymerization may be a cyclic ester, or lactone. Cyclic esters include, without limitation, L-lactide, D-lactide, rac-DL-lactide, glycolide, beta-propiolactone, tetramethylglycolide, beta-butyrolactone, gamma-butyrolactone, pivalolactone, and intermolecular cyclic esters of alpha-hydroxybutyric acid, alpha-hydroxyisobutyric acid, alpha-hydroxyvaleric acid, alpha-hydroxyisovaleric acid, alpha-hydroxycaproic acid, alpha-hydroxyalpha-ethylbutyric acid, alpha-hydroxyisocaproic acid, alphahydroxy-beta-methylvaleric acid, alpha-hydroxyheptanoic acid, alpha-hydroxyoctanoic acid, alpha-hydroxydecanoic acid, alpha-hydroxymyristic acid, alpha-hydroxystearic acid, and alpha-hydroxylignoceric acid. The cyclic ester used for the ring opening polymerization may comprise a single cyclic ester, resulting in a homopolymer, or may comprise two or more different cyclic esters resulting in a co-polymer. Homopolymers for use in the conjugates may include homopolymers of L-lactide, D lactide, rac-DL-lactide, and glycolide. Copolymers for use in the conjugates may include polymers of one or more of the previously mentioned lactide or glycolide monomers with: beta-propiolactone, tetramethylglycolide, beta-butyrolactone, gamma-butyrolactone, pivalolactone, and intermolecular cyclic esters of alpha-hydroxybutyric acid, alpha-hydroxyisobutyric acid, alpha-hydroxyvaleric acid, alpha-hydroxyisovaleric acid, alpha-hydroxycaproic acid, alpha-hydroxyalpha-ethylbutyric acid, alpha-hydroxyisocaproic acid, alphahydroxy-beta-methylvaleric acid, alpha-hydroxyheptanoic acid, alpha-hydroxyoctanoic acid, alpha-hydroxydecanoic acid, alpha-hydroxymyristic acid, alpha-hydroxystearic acid, and alpha-hydroxylignoceric acid.

Copolymers for use in the conjugates may include copolymers of lactide (L-lactide, D lactide or rac-DL-lactide) and glycolide.

A variety of appropriate catalysts are known for use in ring-opening polymerization, such as transition metal catalysts and bifunctional thiourea organocatalysts known in the art. Hydrogen bond-mediated catalyst systems derived from amidine or guanidine bases, such as 1,8-diazabicyclo[5.4.0] undec-7-ene (DBU)[18-20] and 1,5,7-triazabicyclo[4.4.0]dec-5-ene (TBD)[19,21] or various thiourea/tertiary amine base (TU/A) cocatalysts[22-25] may provide good control over the molecular weight and polydispersity obtained in the ring-opening polymerization of lactone monomers with alcohol initiators. With regard to lactide (and glycolide) monomers, the thiourea/amine co-catalyst systems may be more effective than TBD for the ring-opening polymerization, allowing for the control over the desired PLA polymer properties.[25] Bifunctional thiourea catalysts, originally developed by Takemoto and coworkers,[26,27] contain both thiourea and tertiary amine functional groups required for monomer and nucleophile activation, respectively, making them a convenient catalyst choice.

During polymerization, the MOR antagonist that functions for polymerization initiation becomes covalently bonded to the growing polymer chain. Accordingly, each polymer chain initiated by the MOR antagonist in the ring-opening polymerization is terminated on one end by the MOR antagonist. Drug loadings (by weight) can thus be controlled by adjusting the ratio of the initiator (MOR antagonist) to the monomer (cyclic ester). Accordingly, a higher ratio of the cyclic ester monomer to MOR antagonist used in the ring-opening polymerization results in a lower relative drug loading.

In certain embodiments, the polymer may have an average molecular weight ($M_n$) up to about 10,000 (g/mol), or up to about 5000, or up to about 3000. The polymer may have an average molecular weight ranging from at least about 2,000. The polymer may have a dispersity (Mw/Mn) of less than 1.6, or less than about 1.3.

The ring-opening polymerization reaction to form the conjugates can be carried out under various reaction conditions (temperature, solvent, concentrations) as is understood in the art. These conditions may be selected to retain activity of the MOR antagonist that is to be conjugated. The polymerization reaction can be carried out in a solvent-free system, or in an appropriate solvent or mixture of solvents. If used, the solvent is an anhydrous, aprotic solvent. Useful solvents for the polymerization reaction include, among others, toluene, xylene, THF, methylene chloride, chloroform, acetonitrile or mixtures thereof. The ring-opening polymerization reaction may be carried out at a temperature range from about 25° C. to about 150° C.

The polymer conjugate product may be purified and collected using methods known in the art for biologically active conjugates of this type. Typically, the polymer conjugate is isolated by precipitation followed by filtration and drying.

Nanoparticles may be formed from the polymer conjugates by various known methods. In a specific embodiment, nanoprecipitation is employed in which a solution of the conjugate is added to a solvent or mixture in which the conjugate is insoluble. The polymer conjugate may be converted to the corresponding nanoparticles using a nanoprecipitation method.[9,28] The MOR antagonist-polymer conjugate in an appropriate solvent in which the conjugate is soluble is slowly added, for example by syringe pump, to a stirred counter-solvent. The solvent for the conjugate may be selected from acetonitrile, ethers (i.e., tetrahydrofuran 2-methyl tetrahydrofuran), alcohols with greater than 3 carbons, acetone, 1,3-dioxolane, nitrobenzene, 1,4a-dioxane, chlorinated solvents, dimethylformamide, dimethyl sulfoxide, and the counter-solvent may be selected from water, methanol, ethanol, mixtures thereof, or other solvent in which the conjugate has low solubility and is appropriate for the formation of nanoparticles. The counter-solvent may include one or more stabilizers, such as polyvinyl alcohol, poloxamer, carbopol, deoxycholic acid, and other amphiphilic stabilizers. The resulting nanoparticles may be collected by filtration or centrifugation, and then purified and lyophilized to afford the desired MOR antagonist-polymer nanoparticles.

MOR antagonist-polymer nanoparticles have a high loading of the MOR antagonist. The weight % of the MOR antagonist in the MOR antagonist-polymer nanoparticles is greater than 0.1%, or is greater than 1%, or is greater than 5% or is greater than 10%. The weight % of the MOR antagonist in the MOR antagonist-polymer nanoparticles may be as high as 30%, or is less than 25%, or is less than 20%, or is less than 15%.

The particle size of the MOR antagonist-polymer nanoparticles may be from about 50 nm to about 10,000 nm, or from about 50 nm to about 1000 nm, or from about 100 nm to about 800 nm, or from about 200 nm to about 700 nm. Alternatively, the MOR antagonist-polymer conjugate may be administered as a solid polymer rod with diameters from about 0.05 mM to about 10 mM.

The methods described herein allow preparation of MOR antagonist-polymer nanoparticles that have very high drug loadings (up to 30%), nearly quantitative loading efficiencies, controlled release profiles without burst release effects, and narrow particle-size distributions. The rate of MOR antagonist release from the particle can be modulated by the cleavage of linkage to the polymer, typically an ester bond, the nature of the monomers used to make the polymer, the size of the polymer and the nature and size of the nanoparticle. This offers much more control than the diffusion of the encapsulated non-covalently bonded drug from a particle in which the release kinetics may be controlled by adjusting drug loading and particle size.

This method of covalent conjugation of drug to nanoparticle possesses several advantages over traditional, non-covalent nanoparticle delivery systems as it permits higher drug loadings and promotes batch-to-batch consistency in the preparation of NPs while also avoiding the unwanted phenomenon of burst release.[10-13] As a result, the MOR antagonist-polymer nanoparticles may be used deliver a sustained, linear in vivo release of MOR antagonist capable treating or preventing the toxic effects of synthetic opioids. When administered to a patient, the sustained, linear release kinetics maintains an extended MOR blockade against the effects of a high dose opioid.

In various embodiments, the MOR antagonist-polymer nanoparticles may be used for the treatment or prevention of one or more side effects associated with the use or misuse of opioid analgesics. A therapeutically effective amount of the MOR antagonist-polymer nanoparticles may be administered to a patient in need thereof as an opioid reversal agent in order to reverse opioid intoxication or overdose, and to reverse opioid effects, such as hypotension, respiratory depression, and sedation. The MOR antagonist-polymer nanoparticles provide a steady, sufficient dose of MOR antagonist to effectively overcome the toxic effects of opioids, and particularly synthetic opioids. The MOR antagonist-polymer nanoparticles may provide a steady, sufficient dose of MOR antagonist such as naloxone to reverse an opioid overdose and to sustain the reversal, while at the same time avoiding the effects of precipitated opioid withdrawal.

In some embodiments, the MOR antagonist-polymer nanoparticles may be co-administered with an amount of the non-conjugated MOR antagonist. The free MOR antagonist provides an immediate action for the reversal of opioid effects. The MOR antagonist-polymer nanoparticles provided a sustained protection against the opioid effects that is effective after the initial dose of free MOR antagonist is metabolized.

The MOR antagonist-polymer nanoparticle may release a therapeutically effective amount the MOR antagonist over a period of up to 30 days or more. When used as an opioid reversal agent, and particularly for reversing the effects of opioid overdose, the MOR antagonist-polymer nanoparticle may release a therapeutically amount of the MOR antagonist over a period of about 6 hours to about 48 hours. The MOR antagonist-polymer nanoparticle may release a therapeutically amount of the MOR antagonist over a period of up to about 6 hours, or up to about 12 hours, or up to about 20 hours, or up to about 24, hours or up to about 28 hour, or up to about 36 hours.

The naloxone-polymer nanoparticles may release naloxone to yield a constant plasma concentration of at least 8 ng/ml and up to 240 ng/ml over a period of at least 6 hours, or at least 12 hours, or at least 20 hours, or at least 24 hours, or at least 28 hours, or at least 36 hours.

In other embodiments, the MOR antagonist-polymer nanoparticles may be used for the treatment or prevention of opioid abuse or addiction. A therapeutically effective amount of the MOR antagonist-polymer nanoparticles may be administered to a patient in need thereof to prevent the narcotic effects of an opioid.

In another embodiment, the MOR antagonist-polymer nanoparticles may be used for the prevention of the effects of accidental exposure to opioids. A therapeutically effective amount of the MOR antagonist-polymer nanoparticles may be administered to a patient at risk of accidental exposure to opioids, and particularly synthetic opioids to reduce or eliminate the risk associated with the potential accidental opioid exposure.

The term "therapeutically effective amount," as used herein, refers to the amount of MOR antagonist, when administered to the individual in the particulate form, is effective to at least partially reverse opioid intoxication or overdose and/or to reverse negative opioid effects, such as hypotension, respiratory depression, and sedation. When used to treat or thwart opioid abuse, the therapeutic amount refers to the amount of MOR antagonist, when administered to the individual in the particulate form that prevents the narcotic effects of the opioid and/or discourages the opioid abuse.

Particulate formulations (i.e., those containing nanoparticles) can be administered to a subject by any known method appropriate for the size of the particle. The conjugates and nanoparticles of the conjugates may be used in the preparation of a medicament for in vivo delivery of the MOR antagonist. In specific embodiments, the medicament manufactured is in the form of particles, particularly nanoparticles, for administration in an appropriate dosage form. In specific embodiments, the medicament further comprises a pharmaceutically acceptable carrier or diluent and particularly a carrier or diluent suitable for the desired form of administration. The dosage form may be for intramuscular injection, nasal inhalation, subcutaneous injection, or adipose tissue injection.

Particulate formulations herein can, for example, be in the form of dry powders which can be rehydrated as appropriate.

As is understood in the art, the therapeutically effective amount of the MOR antagonist will depend at least in part upon, the mode of administration, any carrier or vehicle (e.g., solution, emulsion, etc.) employed, the specific disorder or condition, and the specific individual to whom the compound is to be administered (age, weight, condition, sex, etc.). The dosage requirements needed to achieve the "therapeutically effective amount" vary with the particular compositions employed, the route of administration, the severity of the symptoms presented and the particular subject being treated.

The following non-limiting examples serve to illustrate certain embodiments of the invention but are not to be construed as limiting. Variations and additional or alternative embodiments will be readily apparent to the skilled artisan on the basis of the disclosure provided herein.

EXAMPLES

Naloxone hydrochloride dihydrate was purchased from Sigma-Aldrich (St. Louis, MO) and subsequently converted to the corresponding free base by acid-base extraction with saturated aqueous $NaHCO_3$. 1-[3,5-Bis(trifluoromethyl)phenyl]-3-[(1R,2R)-(−)-2-(dimethylamino) cyclohexyl] thiourea was obtained from Strem Chemicals, Inc. (Newburyport, Ma.). (3S)-cis-3,6-dimethyl-1,4-dioxane-2,5-dione (L-lactide), anhydrous dichloromethane ($CH_2Cl_2$), dichloroethane (DCE), and toluene ($PhCH_3$) were purchased from Sigma-Aldrich (St. Louis, MO). Naloxone was dissolved in 0.9% saline at a dose of 10 mg/kg. Morphine sulfate, purchased from Sigma Aldrich (St. Louis, MO), was dissolved in 0.9% saline at a dose of 10 mg/kg. Doses were determined based on previous publications.[14] Water was purified via a Millipore Synergy water purification system. All reagents and solvents were used as received unless otherwise noted.

$^1H$ NMR spectra were measured in deuterochloroform ($CDCl_3$) on a Bruker Avance 500 MHz spectrometer. Chemical shifts are reported in ppm from tetramethylsilane with the solvent resonance as the internal standard ($CHCl_3$: δ7.26 ppm). Gel permeation chromatography (GPC) was performed using a Waters GPC system equipped with a Waters 2410 refractive index detector. A Waters pump and a Styragel HR 3 column (7.8×300 mm) was used with THF as the mobile phase solvent. Separations were carried out at 35° C. with a flow rate 1.0 mL/min. Polystyrene standards were used for calibration. LC-MS analysis was performed on a Dionex Ultimate 3000 uHPLC system coupled to a Thermo Scientific TSQ Quantum Access MAX triple quadrupole mass spectrometer. Reverse-phase chromatographic separation was accomplished on an Agilent ZORBAX Eclipse Plus C18 column (3.5 μm, 100×4.6 mm) with acetonitrile ($CH_3CN$) and water ($H_2O$), modified with 0.1% formic acid, as the mobile phase solvents. Standard HPLC method consisted of a linear gradient from 1-95% $CH_3CN$ over 5 min followed by a hold at 95% $CH_3CN$ for 1 min and then a re-equilibration at 1% $CH_3CN$ for 2.5 min. (Total run time: 10 min, flow rate: 0.400 mL/min, injection volume: 10 μL, $T_r$ naloxone: ~5.2 min).

Example 1

Transition Metal Catalyzed Synthesis of Naloxone/PLA Polymer

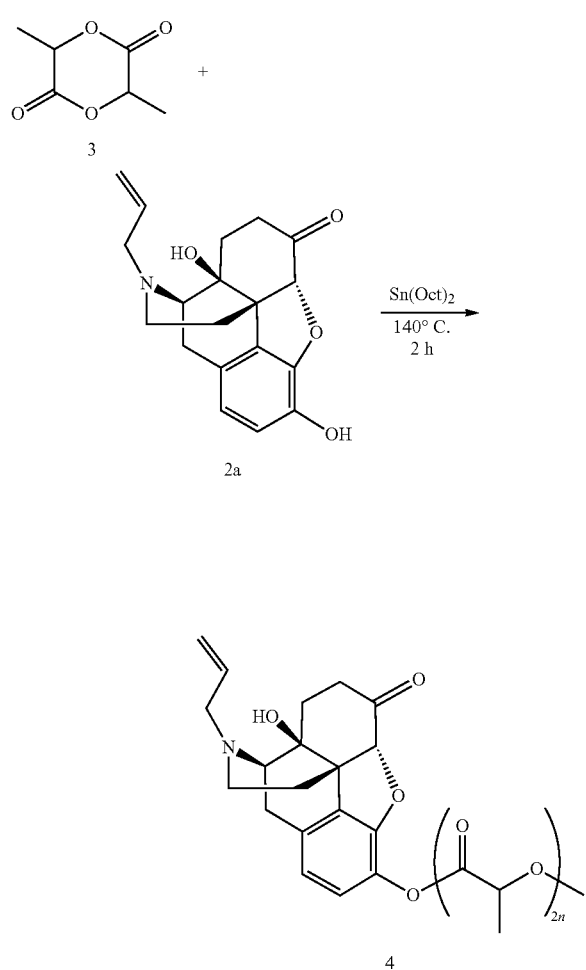

Transition metal catalyzed ROP of lactide 3 with Sn(II) octoate under solvent-free conditions was employed to arrive at naloxone initiated polymer 4.

Naloxone (300 mg, 0.916 mmol), lactide (1.32 g, 9.16 mmol), and stannous octoate (65 mg, 0.160 mmol) was added to a Schlenk flask equipped with a magnetic stir bar. The flask was sealed and purged with $N_2$ for 1 h. The reaction mixture was then heated at 140° C. and stirred for 2 h. The resulting clear, colorless polymeric material was cooled to ambient temperature and the crude product was dissolved in 8 mL of $CH_2Cl_2$ with stirring. The polymer was purified by precipitation into ~250 mL of 4:1 MeOH/$H_2O$ (200 mL MeOH, 50 mL $H_2O$) to yield a sticky, white residue. Washed with MeOH and dried under reduced pressure to afford a white solid.

We targeted a degree of polymerization (DP) of 20 (10 mol % 2a) in order to achieve a drug loading of around 15% weight naloxone, however, GPC analysis revealed the resulting polymers possessed higher molecular weights ($M_n$=5500) and broader polydispersity (PDI=1.47) than desired leading to a lower drug loading (~5 wt %).

Example 2

Solvent-Free Synthesis of Naloxone/PLA Polymer

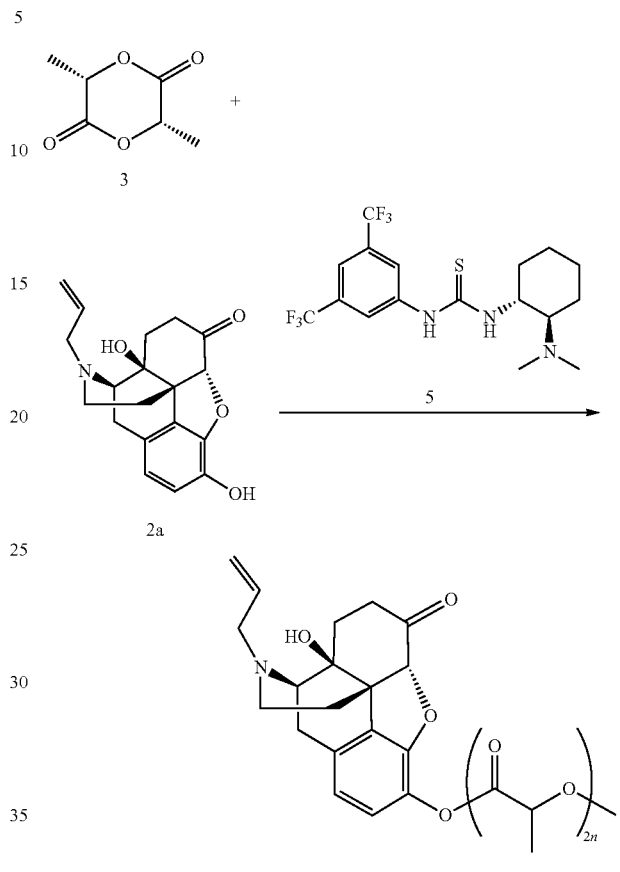

(3S)-cis-3,6-Dimethyl-1,4-dioxane-2,5-dione (3, 1.0 g, 6.94 mmol, 1 equiv) was added to an oven dried 20 mL scintillation vial equipped with a magnetic stir bar under $N_2$. Lactide 3 was melted at 130° C. and then treated with a mixture of naloxone (0.227 g, 0.694 mmol, 10 mol %) and thiourea catalyst 5 (0.144 g, 0.347 mmol 5 mol %). The reaction mixture was heated at 130° C. for 15 min to afford a viscous yellow oil. Upon cooling to ambient temperature, the oil solidified and the bulk solid was dissolved in ~10 mL of $CH_2Cl_2$.

The polymer was purified by precipitation into 150 mL of cold MeOH by slow dropwise addition via syringe. The precipitate was collected via centrifugation @ 4500 rpm for 30 min to furnish a pale yellow to off-white solid. After decanting the supernatant liquid, the solid was subsequently washed with MeOH (15 mL) with centrifugation at 4500 rpm for 30 min (3×). The precipitate was dried under vacuum to afford 643 mg of the desired polymer as an off-white solid. $^1$H NMR (500 MHz, $CDCl_3$): δ 6.85 (d, J=8.3 Hz, 1H), 6.68 (d, J=8.3 Hz, 1H), 5.87-5.77 (m, 1H), 5.19-5.13 (q, J=7.1 Hz, 27 H), 4.67 (s, 1 H), 4.38-4.32 (m, 1 H), 3.21-3.09 (m, 3H), 3.06-2.96 (m, 2H), 2.65-2.56 (m, 2H), 2.40 (ddd, J=5.1, 12.7, 12.7 Hz, 1H), 2.28 (ddd, J=3.2, 3.2, 14.6 Hz, 1H), 2.13 (ddd, J=3.8, 12.4, 12.4 Hz, 1H), 1.87 (ddd, J=3.2, 5.0, 13.5 Hz, 1H). 1.58 (d, J=7.1 Hz, 86H). GPC: $M_n$=3100, $W_n/M_n$=1.10.

Example 3

Solution-Based Synthesis of Naloxone/PLA Polymers

An oven-dried microwave vial equipped with a magnetic stir bar was charged with L-lactide 3 (0.500 g, 3.47 mmol, 1 equiv) and purged with $N_2$ for 30 min whereupon the lactide was dissolved in 4 mL of anhydrous solvent. A second oven-dried microwave vial was charged with naloxone (0.114 g, 0.347 mmol, 10 mol %), and thiourea catalyst 5 (0.072 g, 0.173 mmol 5 mol %) and purged with $N_2$ for 30 min. The solids were dissolved in 1 mL of anhydrous solvent. The solution of naloxone and catalyst was added to the lactide and the reaction was maintained at the prescribed temperature for 24 h. The reaction was cooled to ambient temperature then added to 75 mL of cold MeOH slowly dropwise via syringe. The resulting white suspension was centrifuged at 4000 rpm for 25 min (2×50 mL centrifuge tubes). The supernatant liquid was decanted and the precipitate was resuspended in MeOH (25 mL each tube) then centrifuged at 4000 rpm (repeated 3×). The resulting product was dried under vacuum to obtain the desired polymer as a white solid.

Reactions were conducted for the prescribed times and conditions reported below in Table 1 and the resulting polymers were purified via precipitation into cold MeOH.

TABLE 1

Organocatalyzed naloxone-initiated ROP of L-lactide

| Ex # | Solvent | Temp (° C.) | Cat (mol %) | Time (h) | Conv (%)[a] | $M_n^b$ | $M_w/M_n^b$ | $DP^a$ |
|---|---|---|---|---|---|---|---|---|
| 2 | neat | 130 | 5 | 0.25 | 97 | 3000 | 1.13 | 28 |
| 3a | $CH_2Cl_2$ | RT | 5 | 24 | 9 | 2200 | 1.06 | 34 |
| 3b | DCE | 80 | 5 | 24 | 75 | 2700 | 1.09 | 44 |
| 3c | $PhCH_3$ | 100 | 5 | 24 | 97 | 2700 | 1.10 | 24 |

[a]Determined via $^1$H NMR
[b]Determined via GPC
[c]Mole ratio of [lactide/naloxone] = 10:1

Figure 3:
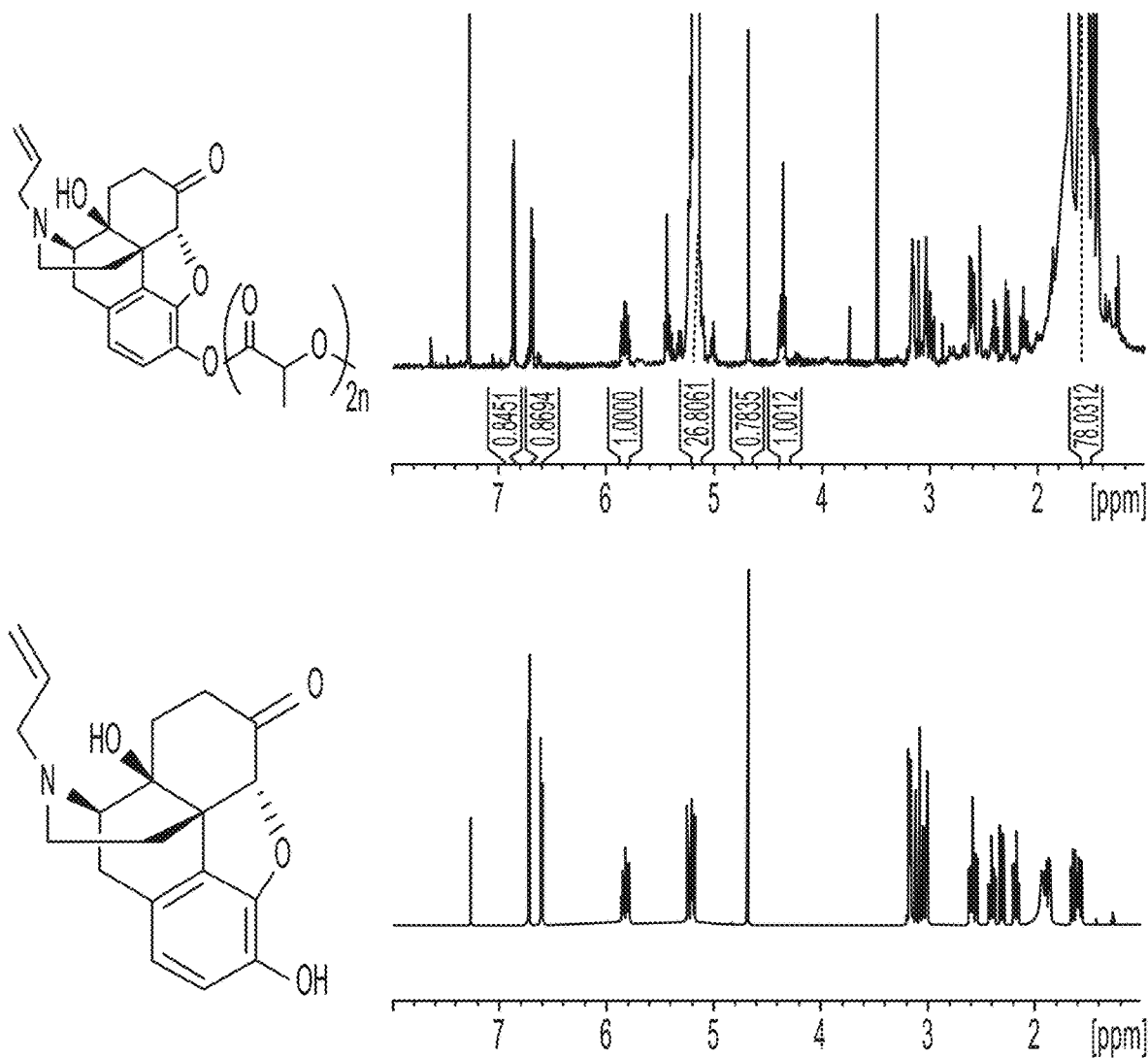
FIG. 3 shows the $^1$H-NMR of (a) naloxone-poly(L-lactic acid) (Nal-PLA), and (b) naloxone.
Figure 4:
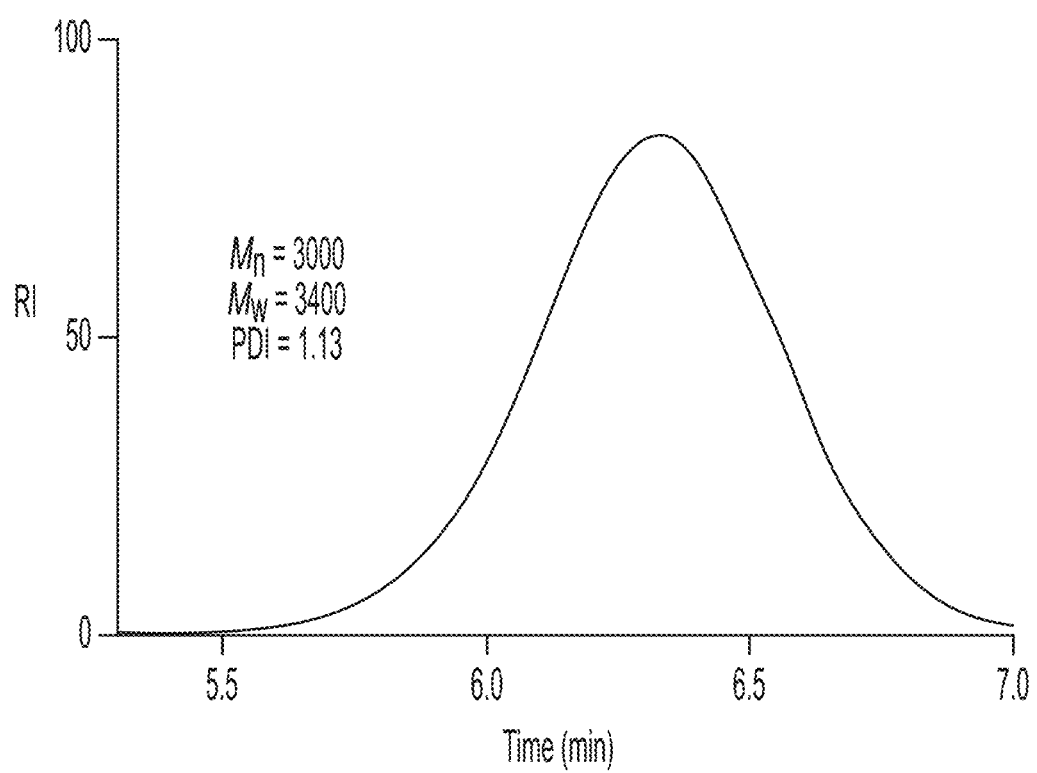
FIG. 4 shows the GPC of Nal-PLA prepared by the organocatalyzed, solvent-free ring-opening polymerization of L-lactide.

Solvent-free conditions (Ex. 2) resulted in the rapid and complete conversion to the desired polymer 4 within 15 min and afforded excellent control over the molecular weight and polydispersity as determined by GPC analysis. Polymer structure and degree of polymerization (DP) was confirmed by $^1$H NMR (FIG. 3) and the drug loading of naloxone was determined to be 12 wt %. Comparable results were obtained for the solvent-based reaction employing toluene (Ex. 3c) wherein complete conversion to the desired polymer 4 was observed after 24 h at 100° C. and a drug loading of 13% was achieved (DP=24 based on $^1$H NMR analysis). Polymerization under milder temperatures with solvents like $CH_2Cl_2$ and DCE (Ex. 3a and 3b) resulted in lower conversions indicating the need for elevated temperature to achieve the desired reactivity. Given its operationally simple reaction set-up, faster reaction times, and avoidance of potentially toxic solvents, we opted to utilize the solvent-free route for the production of larger batches of Nal-PLA 4 for further studies.

Example 4

Preparation of Covalently Linked Naloxone/PLA Nanoparticles

Nal-PLA polymer 4 was converted to the corresponding cNPs using a previously described nanoprecipitation method.[9,28] A solution of Nal-PLA polymer hybrid (40 mg) in 4 mL of $CH_3CN$ was added slowly dropwise via syringe pump to a solution of 0.3% PVA in $H_2O$ (30 mL) at a flow rate of 20 µL/min (0.02 mL/min) with rapid stirring. Upon completion of the addition, the resulting white, turbid mixture was maintained overnight at ambient temperature with rapid stirring. Nanoparticles were initially collected by centrifugation at 4500 rpm then subsequently washed with $H_2O$ (3×10 mL) with centrifugation at 4500 rpm for 30 min. The supernatant liquid was decanted and the resultant precipitate was resuspended in about 10 mL of $H_2O$ and lyophilized to yield 25 mg of a fluffy, white solid.

Example 5

Characterization of cNP-Nal Covalent Nanoparticles

Figure 5A:
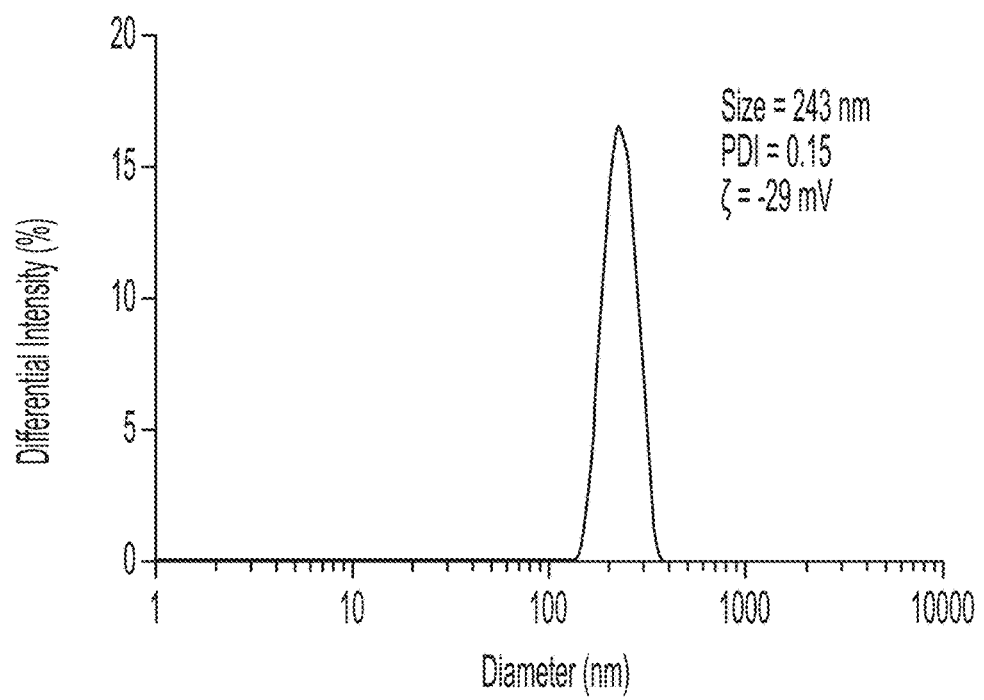
FIG. 5 shows the characterization of covalently loaded Nal-PLA nano-particles by (a) size distribution of cNP-Nal via DLS analysis, and (b) transmission electron micrograph of cNP-Nal particles.
Figure 5B:
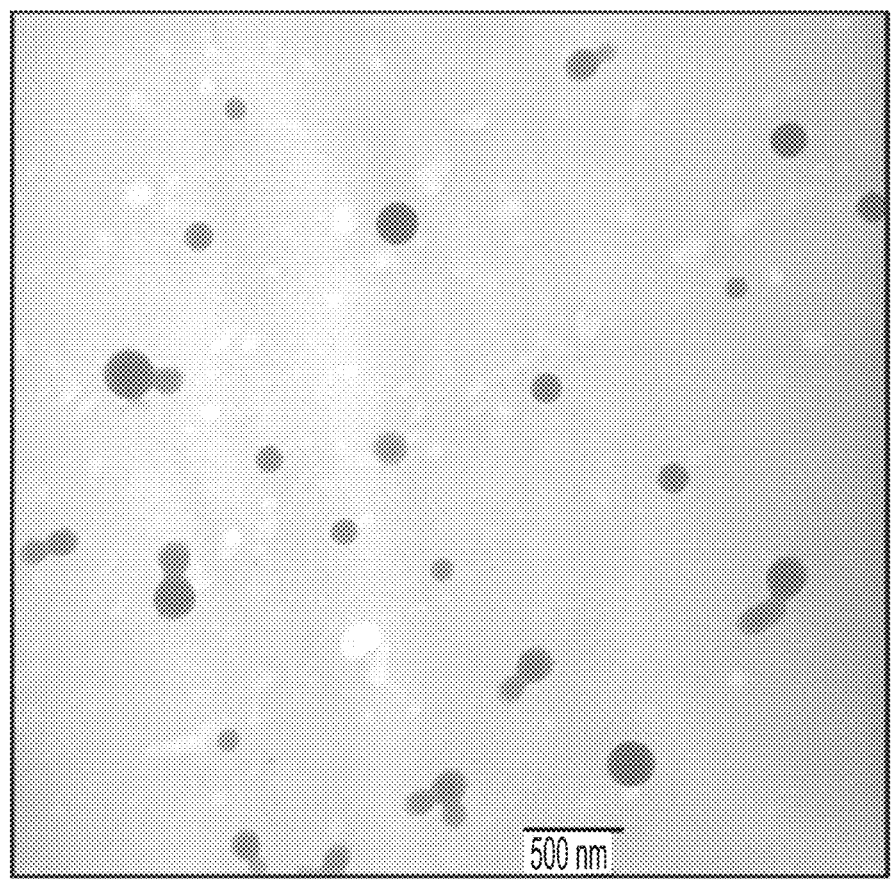

Dynamic light scattering (DLS), zeta potential, and transmission electron microscopy (TEM) were employed for the physical characterization of cNP-Nal particles. DLS measurements showed the formation of well-defined particles with an average diameter of 243 nm and a narrow, monomodal size distribution with polydispersity of 0.15 (FIG. 5a). cNP-Nal also exhibited a strong, negative zeta potential value ($\zeta$=−29 mV) consistent with the presence of lactic acid chain ends. These results were confirmed by TEM morphological analysis which provided images of well-dispersed, spherical cNP-Nal particles lacking any visible surface cracks or voids (FIG. 5b).

Dynamic Light Scattering

Size and zeta potential of the covalent nanoparticles were measured using a NanoPlus3 dynamic light scattering (DLS) instrument. Solutions of covalent nanoparticles were prepared in ultra-pure water at ~0.1 mg/mL.

Transmission Electron Microscopy

A small drop of solution containing the sample was placed on a formvar coated 300 mesh copper grid (Electron Microscopy Services, Hatfield, PA). After 30 seconds, the drop was removed by blotting with filter paper. The sample solution that remained on the grid was allowed to dry before inserting the grid into the microscope. The grids were viewed on a Hitachi H-7100 transmission electron microscope operating at 75 kV. Digital images were obtained using an AMT Advantage 10 CCD Camera System.

Example 6

Naloxone Release Rate Determination

Figure 6:
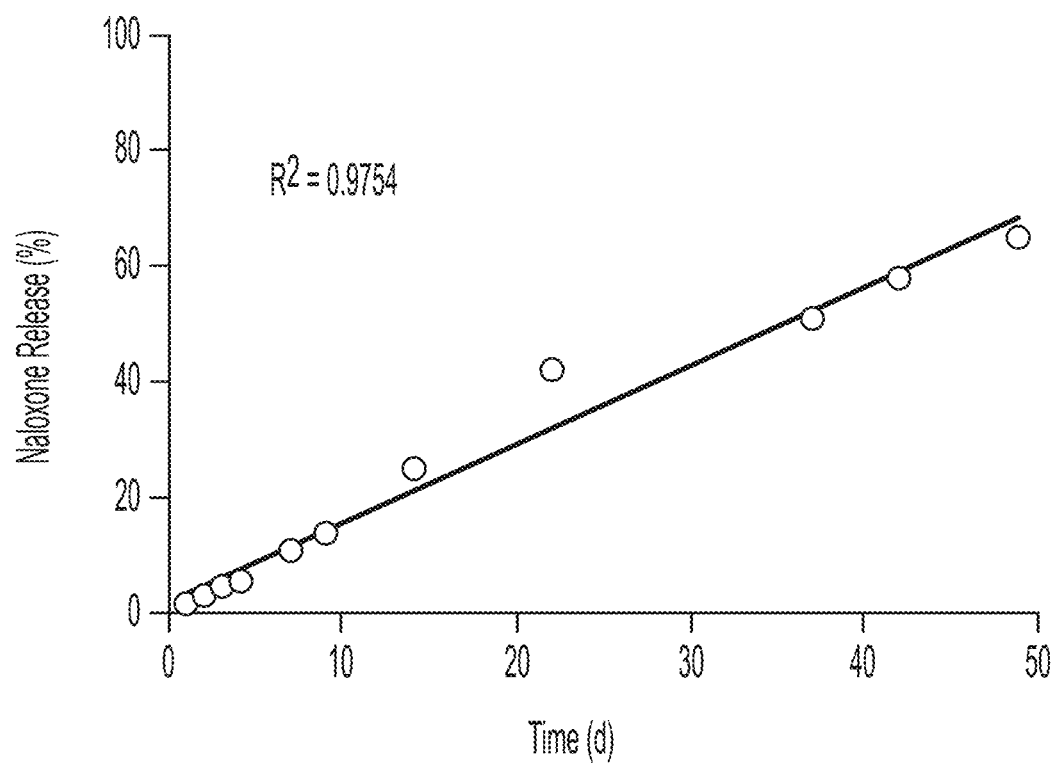
FIG. 6 shows the cumulative release of naloxone from cNP-Nal in PBS buffer (pH 7.4).

Controlled release studies were performed to evaluate the ability of cNP-Nal to provide a linear, sustained dose of naloxone. In vitro release rates of naloxone from the cNP-Nal were completed over the course of seven weeks. Preliminary data show linear release of naloxone demonstrating cNP-Nal as a suitable vehicle for linear antidote delivery without burst release kinetics (FIG. 6). In vitro naloxone release rates were determined by incubation of cNP-Nal particles at 37° C. 1× phosphate buffered saline (pH 7.4)

with concomitant monitoring of the appearance of naloxone via LC-MS. Data points were normalized to maximum naloxone release obtained via base-mediated cNP hydrolysis in the presence of 1 M NaOH at 37° C. for 24 h.

cNP-Nal (4.2 mg) was suspended in 4.2 mL of pH 7.4 phosphate buffered saline (1× PBS) with subsequent ultrasonication. The reaction vial was sealed then horizontally shaken in a GeneMate incubated shaker at 37° C. and 110 rpm. Aliquots (30 μL) were taken from the thoroughly mixed suspension at predetermined time intervals (up to 50 days) and centrifuged at 14000 rpm for 5 min. Samples of the supernatant liquid (20 μL) were diluted with 500 μL of LC-MS grade $H_2O$ and analyzed via LC-MS. Maximum naloxone in vitro release was determined by treating cNP-Nal (4.2 mg) with 4.2 mL of 1 M NaOH and incubating at 37° C. for 24 h. Given the fully degradable nature of PLA, complete hydrolysis and therefore complete naloxone release would be achieved under these conditions. In vitro controlled release was assessed via LC-MS by normalizing mass intensities taken from the extracted ion chromatogram (EIC) at each time point to maximum naloxone release and plotted as % naloxone release.

Figure 7:
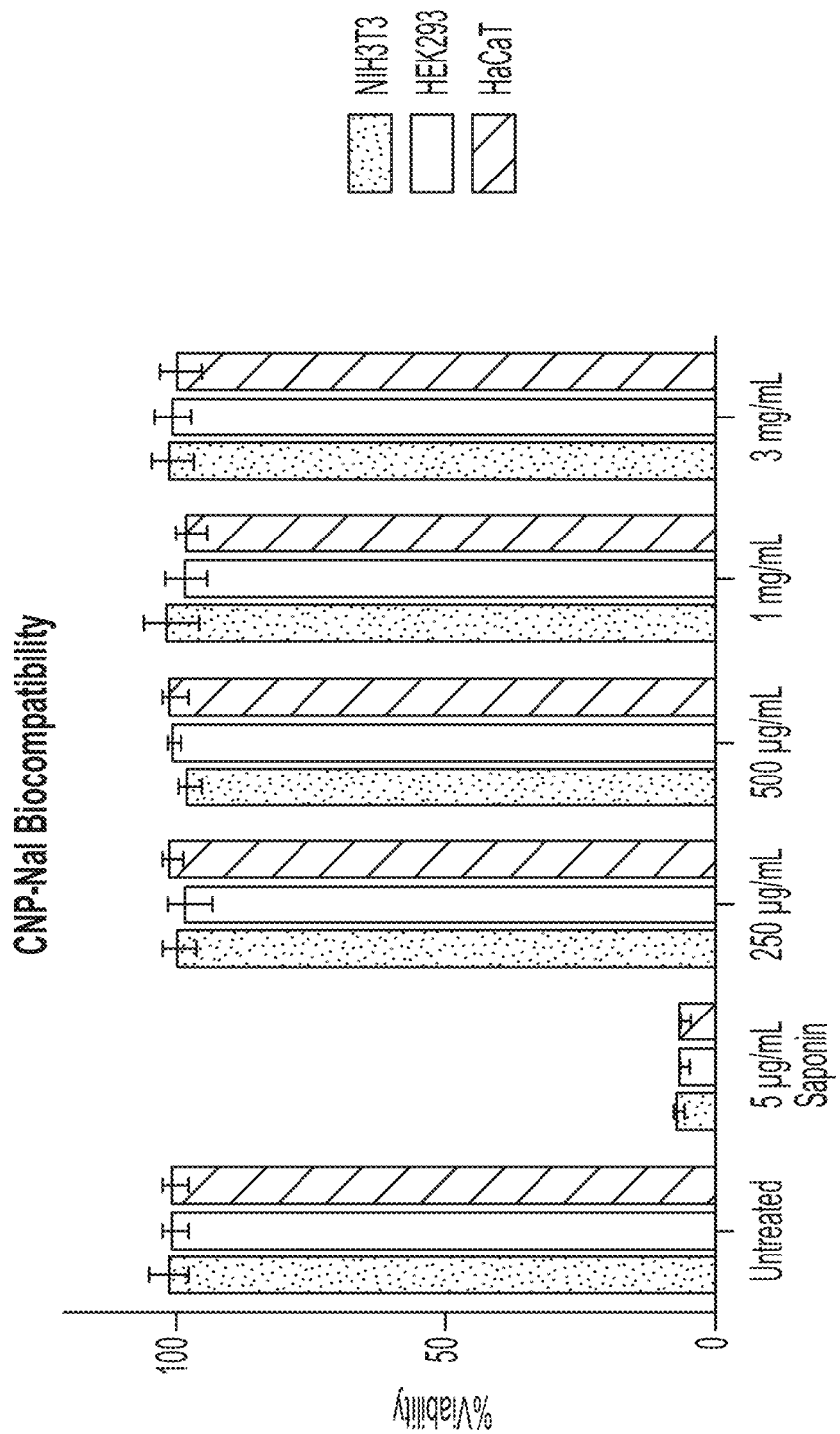
FIG. 7 shows a biocompatibility assays illustrating the effect of 72 hour treatments of cell lines with cNP-Nal versus negative control (untreated) and positive cytotoxic control (Saponin) (data presented is the average of three replicates).

Example 7 cNP-Nal were evaluated for potential cytotoxic activity in multiple cell lines (FIG. 7). Human embryonic kidney cells (HEK293), murine embryonic fibroblasts (NIH3T3), and human keratinocytes (HaCaT) were selected for this study as they represent tissues that could be exposed to cNPs following the preferred routes of cNP administration (subcutaneous or intramuscular). cNP-Nal proved to be fully biocompatible across the tested concentration range (250 μg/mL-3 mg/mL of nanoparticles with equal volume applied) with all three cell lines demonstrating excellent viability.

Cell Culture

Human embryonic kidney cell line (HEK293), murine embryonic fibroblast cell line (NIH3T3) and human keratinocyte cell line (HaCaT) were grown and maintained in Dulbecco's modified eagle media (DMEM; Gibco, Gaithersburg, MD) supplemented with 10% fetal bovine serum (Thermo Fisher Scientific, Waltham, MA) and 1% Penicillin-streptomycin (Gibco, Gaithersburg, MD).

Cytotoxicity Assay

Cytotoxicity was assessed using direct CyQUANT® nucleic acid-sensitive fluorescence assay (Thermo Fisher Scientific, Waltham, MA, USA) according to the manufacturer's instructions. Briefly, 100 μL aliquots of cell suspension containing $1.25 \times 10^3$ cells/mL were plated in wells of a 96-well microplate (Corning Inc., Corning, NY, USA) and allowed to adhere for 6 h. PLA nanoparticles with varying concentrations were added to respective treatment wells and co-incubated with cells for 72 h. Saponin (#84510, Sigma-Aldrich), 5 μg/mL, was used as a positive cytotoxicity control. After 72 h, cells were labeled with CyQUANT® Direct and fluorescence intensities measured with a TECAN spectrophotometer reader (TECAN, Männedorf, Switzerland). Cytotoxicity was assessed by normalizing fluorescence intensities to non-treatment control group and plotted as percent viability.

Example 8

Figure 8A:
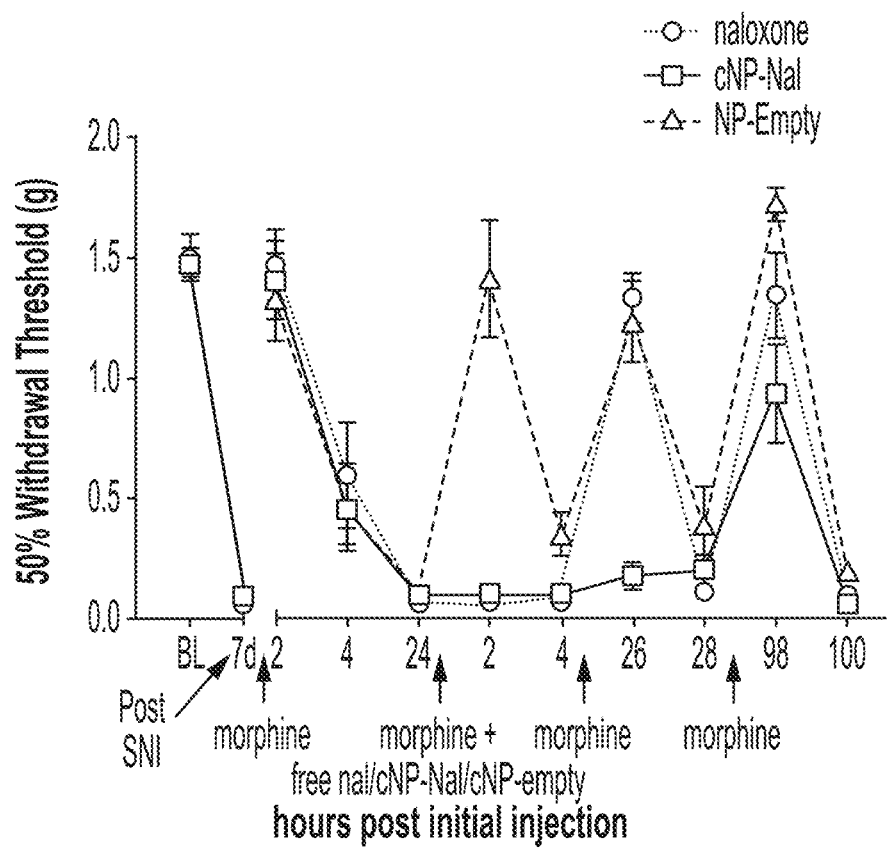
FIG. 8 shows the results from an in vivo efficacy of cNP-Nal and free naloxone in a spared nerve injury (SNI) mouse model treated with morphine (a) or saline (b).
Figure 8B:
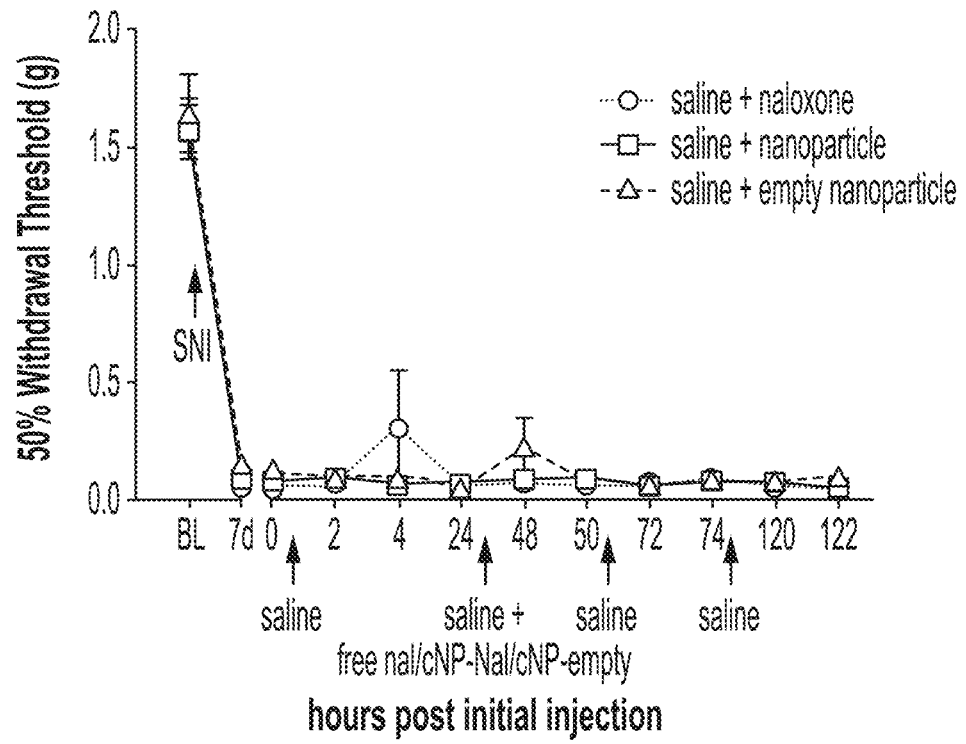

In Vivo Efficacy cNP-Nal (10 mg/kg) was effective at maintaining an extended MOR blockade against the effects of high dose morphine (10 mg/kg) vs. free naloxone in a spared nerve injury (SNI) mouse model (FIG. 8a). cNP-Nal was effective in blocking the analgesic effects of morphine for at least up to 28 h after administration, more than 100% longer than free naloxone. Furthermore, neither cNP-Nal nor cNP-empty had any significant effect in control animals (FIG. 8b). Although the effects of cNP-Nal had faded by 120 hours, the present experiment does not allow for determination of the precise in vivo time course for cNP-Nal.

Animals

All mouse protocols were in accordance with the guidelines of the National Institute of Health and approved by the Animal Care and Use Committee of Duquesne University. Male and female C57B1/6J mice underwent surgery for spared nerve injury at 9 weeks old. Animals were group housed with littermates after surgery and kept on a 12-hour light/dark cycle from 7 am to 7 pm with ad libitum access to food and water. Behavioral experimentation was performed during the light cycle when mice were 10-11 weeks of age. The experimenter was blinded to treatment until after all data was analyzed.

Spared Nerve Injury Surgery

Spared nerve injury was completed as previously described.[14] Briefly, mice were anesthetized with 3% isoflurane and the fur over the left hindlimb was shaved with electric clippers. A small 1 cm incision was made in the skin parallel to the sciatic nerve, the biceps femoris muscle was moved aside, and the nerve was exposed. The tibial and common peroneal branches of the sciatic nerve were ligated with silk suture and cut 2 mm distal to the ligatures. The sural nerve was left unmanipulated and intact. The skin was then closed with sutures over the surgical site and mice recovered on a heating pad.

Behavioral Assay

Mechanical sensitivity was assayed with von Frey filaments to determine 50% withdrawal thresholds using the up/down method.[15,16] Animals were placed on a wire mesh in individual Plexiglas boxes and allowed to habituate for 2 h prior to testing. Filaments ranging from 0.02 to 2.56 g were used to assay 50% withdrawal thresholds prior to SNI surgery. Seven days after surgery, mice were assessed for mechanical sensitivity again to confirm surgical success. An a priori threshold effect of SNI was set at 50%. In other words, animals exhibiting a less than 50% decrease in withdrawal threshold from baseline were not included in remainder of the study. Only 2 of 38 animals were excluded from the study based on this threshold. Intraperitoneal injections of either morphine or saline were administered in a blinded fashion and mechanical sensitivity was assessed again at 2, 4, and 24 h post injection. The following day, animals received intraperitoneal injections of either morphine or saline combined with a subcutaneous injection of free naloxone, cNP-Nal, or empty NP (cNP-empty), and mechanical sensitivity was assayed at 2 and 4 h post injection (corresponding to 48 and 50 h timepoints, FIG. 6a). Morphine or saline was injected again 1 and 3 days after nanoparticle administration and mechanical sensitivity was assayed at 2 and 4 h time points following injection (corresponding to 72/74 and 120/122 h timepoints in FIG. 6a).

Statistical Analysis

GraphPad Prism 5 was used for analysis of behavioral data. All data is shown as mean±SEM. Von Frey data was analyzed using two way analysis of variance (ANOVA) followed by Bonferroni post hoc tests. Statistical significance was defined as p<0.05.

Example 9

We evaluated the cNP-Nal impact on fentanyl-induced analgesia and the reduction of POW in opioid-dependent mice.

Figure 9A:
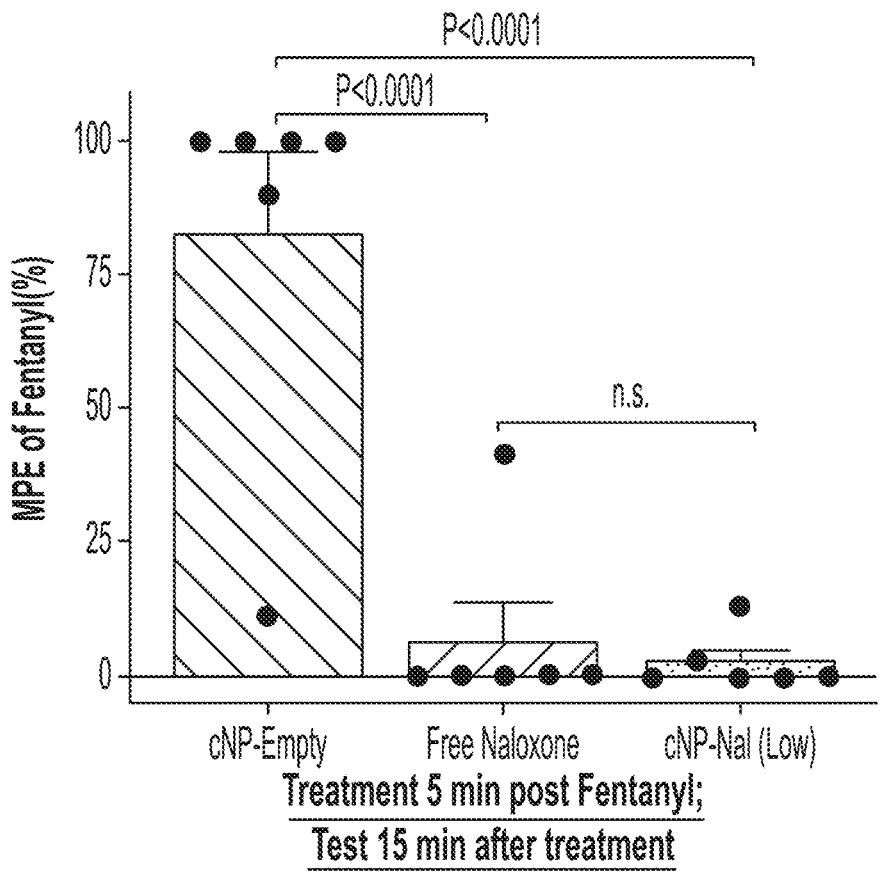
FIG. 9 shows in vivo impact of cNP-Nal on fentanyl-induced analgesia (FIG. 9A) and on the reduction of precipitated opioid withdrawal (POW) in opioid-dependent mice (FIG. 9B).

First, cNP-Nal reduces fentanyl (0.2 mg/kg) inhibition of hot-plate nocifensive behavior in mice. No significant difference was observed at 15 minutes after naloxone delivery (20 minutes after fentanyl) between the cNP-Nal and free naloxone groups (10 mg/kg; FIG. 9A). As seen in FIG. 9A, cNP-Nal (low 0.75 mg/kg) and free naloxone (10 mg/kg) both acutely block fentanyl (0.2 mg/kg) analgesia in the hot plate assay.

Figure 9B:
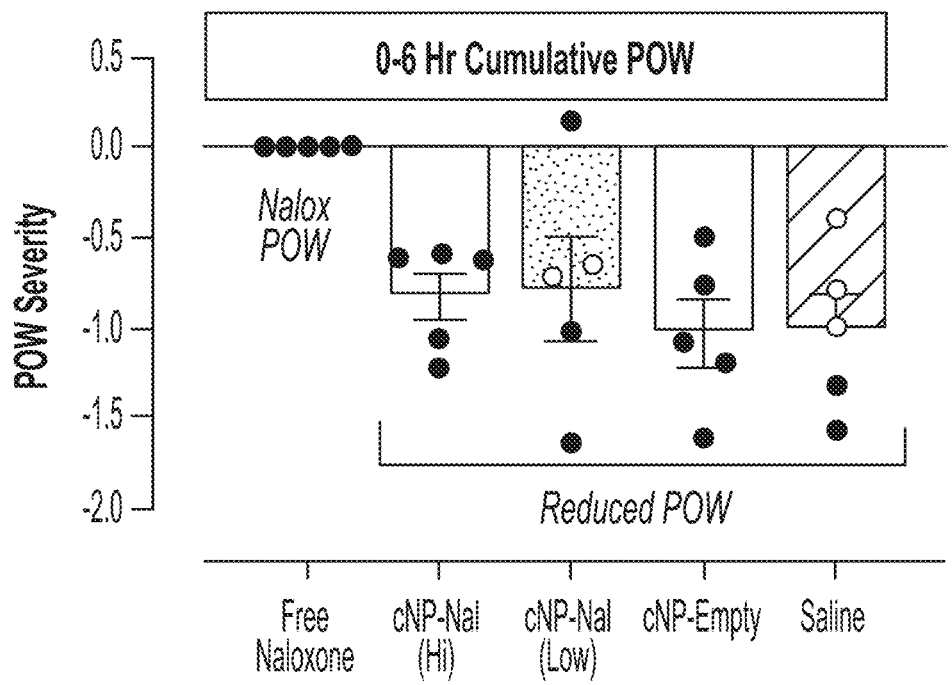

Second, cNP-Nal was evaluated for its effect on precipitated opioid withdrawal (FIG. 9B). After opioid dependence was established, mice treated with free naloxone (8 mg/kg) showed significant POW-related behavior (set as "0" on POW severity Z score scale in FIG. 9B). POW symptoms for mice treated with cNP-Nal (0.75 and 7.5 mg/kg dose) are less than the free naloxone and not different from neg controls (saline and cNP-Empty). FIG. 9B reports the cumulative POW behavior for cNP-Nal (low 0.75 mg/kg dose and high 7.5 mg/kg dose) as similar to negative controls and considerably lower than free naloxone (8 mg/kg). Data are presented compared to free naloxone POW calculated as Z score of data collected for 6 hours.

It will be appreciated by persons skilled in the art that the present invention is not limited to what has been particularly shown and described. Rather, the scope of the present invention is defined by the claims which follow. It should further be understood that the above description is only representative of illustrative examples of embodiments. The description has not attempted to exhaustively enumerate all possible variations. The alternate embodiments may not have been presented for a specific portion of the invention, and may result from a different combination of described portions, or that other un-described alternate embodiments may be available for a portion, is not to be considered a disclaimer of those alternate embodiments. It will be appreciated that many of those un-described embodiments are within the literal scope of the following claims, and others are equivalent.

REFERENCES (1) Contet, C.; Kieffer, B. L.; Befort, K. Mu Opioid Receptor: A Gateway to Drug Addiction. *Current Opinion in Neurobiology* 2004, 14, 370-378.

(2) Le Merrer, J.; Becker, J. A. J.; Befort, K.; Kieffer, B. L. Reward Processing by the Opioid System in the Brain. *Physiological Reviews* 2009, 89, 1379-1412.

(3) Pattinson, K. T. S. Opioids and the Control of Respiration. *British Journal of Anaesthesia* 2008, 100, 747-758.

(4) Overdose Death Rates. NIH: CDC WONDER. 2018 December.

(5) Dahan, A.; Aarts, L.; Smith, T. W. Incidence, Reversal, and Prevention of Opioid-Induced Respiratory Depression. *Anesthesiology* 2010, 112, 226-238.

(6) Zuckerman, M.; Weisberg, S. N.; Boyer, E. W. Pitfalls of Intranasal Naloxone. *Prehospital Emergency Care* 2014, 18, 550-554.

(7) van der Schier, R.; Roozekrans, M.; van Velzen, M.; Dahan, A.; Niesters, M. Opioid-Induced Respiratory Depression: Reversal by Non-Opioid Drugs. *F1000Prime Reports* 2014, 6.

(8) Sutter, M. E.; Gerona, R. R.; Davis, M. T.; Roche, B. M.; Colby, D. K.; Chenoweth, J. A.; Adams, A. J.; Owen, K. P.; Ford, J. B.; Black, H. B.; Albertson, T. E.; Heard, K. Fatal Fentanyl: One Pill Can Kill. *Academic Emergency Medicine* 2016, 24, 106-113.

(9) Kovaliov, M.; Li, S.; Korkmaz, E.; Cohen-Karni, D.; Tomycz, N.; Ozdoganlar, O. B.; Averick, S. Extended-Release of Opioids Using Fentanyl-Based Polymeric Nanoparticles for Enhanced Pain Management. *RSC Adv.* 2017, 7, 47904-47912.

(10) Du, A. W.; Stenzel, M. H. Drug Carriers for the Delivery of Therapeutic Peptides. *Biomacromolecules* 2014, 15, 1097-1114.

(11) Tong, R.; Cheng, J. Ring-Opening Polymerization-Mediated Controlled Formulation of Polylactide—Drug Nanoparticles. *Journal of the American Chemical Society* 2009, 131, 4744-4754.

(12) Huang, X.; Brazel, C. S. On the Importance and Mechanisms of Burst Release in Matrix-Controlled Drug Delivery Systems. *J. Controlled Release* 2001, 73, 121-136.

(13) Kamaly, N.; Yameen, B.; Wu, J.; Farokhzad, O. C. Degradable Controlled-Release Polymers and Polymeric Nanoparticles: Mechanisms of Controlling Drug Release. *Chemical Reviews* 2016, 116, 2602-2663.

(14) Lax, N. C.; Chen, R.; Leep, S. R.; Uhrich, K. E.; Yu, L.; Kolber, B. J. Polymorphine Provides Extended Analgesic-Like Effects in Mice with Spared Nerve Injury. *Molecular Pain* 2017, 13, 174480691774347.

(15) Dixon, W. J. Efficient Analysis of Experimental Observations. *Annual Review of Pharmacology and Toxicology* 1980, 20, 441-462.

(16) Chaplan, S. R.; Bach, F. W.; Pogrel, J. W.; Chung, J. M.; Yaksh, T. L. Quantitative Assessment of Tactile Allodynia in the Rat Paw. *Journal of neuroscience methods* 1994, 53, 55-63.

(17) Dove, A. P. Organic Catalysis for Ring-Opening Polymerization. *ACS Macro Letters* 2012, 1, 1409-1412.

(18) Brown, H. A.; De Crisci, A. G.; Hedrick, J. L.; Waymouth, R. M. Amidine-Mediated Zwitterionic Polymerization of Lactide. *ACS Macro Letters* 2012, 1, 1113-1115.

(19) Lohmeijer, B. G. G.; Pratt, R. C.; Leibfarth, F.; Logan, J. W.; Long, D. A.; Dove, A. P.; Nederberg, F.; Choi, J.; Wade, C.; Waymouth, R. M.; Hedrick, J. L. Guanidine and Amidine Organocatalysts for Ring-Opening Polymerization of Cyclic Esters. *Macromolecules* 2006, 39, 8574-8583.

(20) Coady, D. J.; Fukushima, K.; Horn, H. W.; Rice, J. E.; Hedrick, J. L. Catalytic Insights into Acid/Base Conjugates: Highly Selective Bifunctional Catalysts for the Ring-Opening Polymerization of Lactide. *Chemical Communications* 2011, 47, 3105.

(21) Pratt, R. C.; Lohmeijer, B. G.; Long, D. A.; Waymouth, R. M.; Hedrick, J. L. Triazabicyclodecene: A Simple Bifunctional Organocatalyst for Acyl Transfer and Ring-Opening Polymerization of Cyclic Esters. *Journal of the American Chemical Society* 2006, 128, 4556-4557.

(22) Dove, A. P.; Pratt, R. C.; Lohmeijer, B. G. G.; Waymouth, R. M.; Hedrick, J. L. Thiourea-Based Bifunctional Organocatalysis: Supramolecular Recognition for Living Polymerization. *Journal of the American Chemical Society* 2005, 127, 13798-13799.

(23) Spink, S. S.; Kazakov, O. I.; Kiesewetter, E. T.; Kiesewetter, M. K. Rate Accelerated Organocatalytic Ring-Opening Polymerization of L-Lactide Via the Application of a Bis(Thiourea) H-Bond Donating Cocatalyst. *Macromolecules* 2015, 48, 6127-6131.

(24) Kazakov, O. I.; Kiesewetter, M. K. Cocatalyst Binding Effects in Organocatalytic Ring-Opening Polymerization of L-Lactide. *Macromolecules* 2015, 48, 6121-6126.

(25) Pothupitiya, J. U.; Dharmaratne, N. U.; Jouaneh, T. M. M.; Fastnacht, K. V.; Coderre, D. N.; Kiesewetter, M. K. H-Bonding Organocatalysts for the Living, Solvent-Free Ring-Opening Polymerization of Lactones: Toward an All-Lactones, All-Conditions Approach. *Macromolecules* 2017, 50, 8948-8954.

(26) Okino, T.; Hoashi, Y.; Takemoto, Y. Enantioselective Michael Reaction of Malonates to Nitroolefins Catalyzed by Bifunctional Organocatalysts. *Journal of the American Chemical Society* 2003, 125, 12672-12673.

(27) Okino, T.; Nakamura, S.; Furukawa, T.; Takemoto, Y. Enantioselective Aza-Henry Reaction Catalyzed by a Bifunctional Organocatalyst. *Organic Letters* 2004, 6, 625-627.

(28) Sanna, V.; Roggio, A.; Posadino, A.; Cossu, A.; Marceddu, S.; Mariani, A.; Alzari, V.; Uzzau, S.; Pintus, G.; Sechi, M. Novel Docetaxel-Loaded Nanoparticles Based on Poly(Lactide-Co-Caprolactone) and Poly(Lactide-Co-Glycolide-Co-Caprolactone) for Prostate Cancer Treatment: Formulation, Characterization, and Cytotoxicity Studies. *Nanoscale Research Letters* 2011, 6, 260.

The invention claimed is:

1. A polymer conjugate comprising: a hydrophobic biodegradable polymer covalently attached to a mu opioid receptor (MOR) antagonist through a linkage consisting of an ester, wherein the ester is prepared from a phenolic hydroxy of the MOR antagonist by ring-opening polymerization, wherein the MOR antagonist is selected from the group consisting of naloxone, naltrexone, and nalmefene, and wherein the polymer consists of polylactic acid.

2. The polymer conjugate of claim 1, which is represented by formula 4, wherein the MOR antagonist is naloxone,

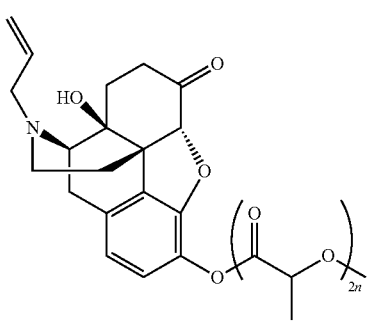

4 wherein n is selected so that the polymer has an average molecular weight (Mn) of up to about 5000 Da.

3. The polymer conjugate of claim 1, wherein the polylactic acid consists of one or more of L-polylactic acid, D-polylactic acid, and DL-polylactic acid.

4. The polymer conjugate of claim 1, wherein the polymer is L-polylactic acid.

5. The polymer conjugate of claim 1, wherein the polymer has an average molecular weight (Mn) of less than about 10,000.

6. The polymer conjugate of claim 1, wherein the polymer has an average molecular weight (Mn) of less than about 5000.

7. The polymer conjugate of claim 1, wherein the polymer has an average molecular weight (Mn) of less than about 3000.

8. The polymer conjugate of claim 1, wherein the polymer has an average molecular weight (Mn) of at least about 2000.

9. The polymer conjugate of claim 1, wherein the weight % of the MOR antagonist in the polymer conjugate is greater than 0.1%, or is greater than 1%, or is greater than 5%, or is greater than 10%.

10. The polymer conjugate of claim 1, wherein the weight % of the MOR antagonist in the polymer conjugate less than 30%, or is less than 25%, or is less than 20%, or is less than 15%.

11. The polymer conjugate of claim 1, wherein the polymer conjugate releases a therapeutically amount of the MOR antagonist over a period of up to 30 days.

12. The polymer conjugate of claim 1, wherein the polymer conjugate releases a therapeutically effective amount of the MOR antagonist over a period of about 6 hours to about 48 hours.

13. The polymer conjugate of claim 1, wherein the MOR antagonist is naloxone and wherein the polymer conjugate releases naloxone to yield a plasma concentration of at least 8 ng/ml over a period of at least 6 hours, or at least 12 hours, or at least 20 hours, or at least 24 hours, or at least 28 hours, or at least 36 hours.

14. Nanoparticles comprising the polymer conjugates according to claim 1.

15. The nanoparticles according to claim 14, wherein the nanparticles have an average particle size of about 50 nm to about 10,000 nm.

16. The polymer conjugate of claim 1, wherein the MOR antagonist-polymer conjugate is in the form of solid polymer rods with diameters from about 0.05 mM to about 10 mM.

17. A method for the treatment of one or more side effects associated with the use or misuse of opioids, comprising administering a therapeutically effective amount of MOR antagonist-polymer nanoparticles to a patient in need thereof, wherein the MOR antagonist-polymer nanoparticles comprise the polymer conjugate according to claim 1.

18. A method for the treatment of opioid overdose, comprising administering a therapeutically effective amount of MOR antagonist-polymer nanoparticles to a patient in need thereof, wherein the MOR antagonist-polymer nanoparticles comprise the polymer conjugate according to claim 1.

19. The method according to claim 17, wherein the treatment with the MOR antagonist-polymer nanoparticles does not result in precipitated opioid withdrawal in the patient.

20. A method for the treatment or prevention of opioid abuse or addiction, comprising administering a therapeutically effective amount of MOR antagonist-polymer nanoparticles to a patient in need thereof, wherein the MOR antagonist-polymer nanoparticles comprise the polymer conjugate according to claim 1.

21. A method for the prevention of the effects of accidental exposure to opioids, comprising administering a therapeutically effective amount of MOR antagonist-polymer nanoparticles to a patient at risk of accidental exposure to opioids, wherein the MOR antagonist-polymer nanoparticles comprise the polymer conjugate according to claim 1.

22. The method according to claim 17, wherein the opioid is a synthetic opioid.

23. The method according to claim 22, wherein the opioid is a fentanyl.

24. The polymer conjugate of claim 1, which releases a therapeutically amount of the MOR antagonist over a period of 36 hours.

* * * * *